(12) United States Patent
Turner et al.

(10) Patent No.: US 8,407,256 B2
(45) Date of Patent: *Mar. 26, 2013

(54) ARRANGEMENT FOR A DISTRIBUTED FILE SYSTEM HAVING DATA OBJECTS MAPPED INDEPENDENT OF ANY DATA OBJECT ATTRIBUTE

(75) Inventors: Bryan C. Turner, Apex, NC (US); John Toebes, Cary, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,541

(22) Filed: Jun. 19, 2012

(65) Prior Publication Data
US 2012/0265782 A1 Oct. 18, 2012

Related U.S. Application Data

(63) Continuation of application No. 11/051,333, filed on Feb. 7, 2005, now Pat. No. 8,229,985.

(51) Int. Cl.
*G06F 17/00* (2006.01)
(52) U.S. Cl. ........ 707/791; 707/793; 707/803; 707/825; 707/959; 707/960
(58) Field of Classification Search .................. 707/791, 707/793, 803, 825, 959, 960
See application file for complete search history.

(56) References Cited

U.S. PATENT DOCUMENTS

| | | | |
|---|---|---|---|
| 5,581,758 A | 12/1996 | Burnett et al. | |
| 6,052,693 A | 4/2000 | Smith et al. | |
| 6,480,857 B1 | 11/2002 | Chandler | |
| 7,689,715 B1 * | 3/2010 | Slaughter et al. | 709/245 |
| 8,229,985 B2 | 7/2012 | Turner et al. | |
| 2004/0216089 A1 | 10/2004 | Kaler et al. | |
| 2006/0206621 A1 | 9/2006 | Toebes et al. | |

OTHER PUBLICATIONS

Anderson et al., "Global namespace for files", IBM Systems Journal, 2004, pp. 702-722, vol. 48, No. 4, IBM.
Bourbonnais et al., "Towards an information infrastructure for the grid", IBM Systems Journal, 2004, pp. 665-688, vol. 43, No. 4, IBM.
Carpenter et al., "Abstract interdomain security assertions: A basis for extra-grid virtual organizations", IBM Systems Journal, 2004, pp. 689-701, vol. 43, No. 4, IBM.
Dabek et al., "Wide-area cooperative storage with CFS", SOPS '01, Oct. 21-24, 2001, Banff, Canada, 14 pages.

(Continued)

*Primary Examiner* — Sana Al Hashemi
(74) *Attorney, Agent, or Firm* — Leon R. Turkevich

(57) ABSTRACT

Each data file of a distributed file system is identified by a corresponding globally-unique object identifier that is independent of any attribute of the data file. A node in the distributed file system has a file system that includes a plurality of directory entries, where each directory entry has a file name field, an attributes field, and an object identifier field configured for specifying a globally-unique object identifier. The globally-unique object identifier is universally reachable by any node of the distributed file system and uniquely identifies the data file, enabling the data file to be universally identifiable by any node based on the corresponding object identifier. The data file can be stored independently of a device file system based on providing a resolution between the data file name and its object identifier, followed by a resolution between the object identifier and a selected location for the data file.

9 Claims, 6 Drawing Sheets

OTHER PUBLICATIONS

Thekkath et al., "Frangipani: A Scalable Distributed File System", 1997, Systems Research Center, Digital Equipment Corporation, Palo Alto, CA, available on the Internet: <URL: http://cs.brown.edu/courses/cs296-2/papers/frangipani.pdf>, 14 pages.

Butte (Grid IT Architect), "Solving the data warehouse dilemma with grid technology", IBM Global Services, Aug. 2004, IBM, 12 pages.

Horn et al., "A Logger System based on Web services", IBM Systems Journal, 2004, pp. 723-733, vol. 43, No. 4, IBM.

Joseph et al., "Evolution of grid computing architecture and grid adoption models", IBM Systems Journal, 2004, pp. 624-645, vol. 43, No. 4, IBM.

Lewis et al., "MyMED: A database system for biomedical research on MEDLINE data", IBM Systems Journal, 2004, pp. 756-767, vol. 43, No. 4, IBM.

Meliksetian et al., "Design and implementation of an enterprise grid", IBM Systems Journal, 2004, pp. 646-664, vol. 43, No. 4, IBM.

Pike et al., "Plan 9 from Bell Labs", 2002, pp. 1-22, available on the Internet: <URL: http://www.cs.bell-labs.com/sys/doc/9.pdf>.

"Preface", IBM Systems Journal, 2004, pp. 622-623, vol. 43, No. 4, IBM.

Mazières, SFS 0.7.1 Manual, 2002, pp. 1-42.

Tan et al., "Service domains", IBM Systems Journal, 2004, pp. 734-755, vol. 43, No. 4, IBM.

"Self-certifying File System", printed Jan. 24, 2005 (10 pages), available on the Internet: <URL: http://www.fs.net/sfswww>.

"File Allocation Table", Wikipedia, printed Dec. 23, 2004 (8 pages), available on the Internet: <URL: http://en.wikipedia.org/wiki/File_Allocation_Table>.

"I-node", Wikipedia, printed Dec. 23, 2004 (2 pages), available on the Internet: <URL: http://en.wikipedia.org/wiki/Inode>.

"Ln (Unix)", Wikipedia, printed Dec. 23, 2004 (1 page), available on the Internet: <URL: http://en.wikipedia.org/wiki/Hard_link>.

"File system", Wikipedia, printed Dec. 23, 2004 (4 pages), available on the Internet: <URL: http://en.wikipedia.org/wiki/File_system>.

\* cited by examiner

ARRANGEMENT FOR A DISTRIBUTED FILE SYSTEM HAVING DATA OBJECTS MAPPED INDEPENDENT OF ANY DATA OBJECT ATTRIBUTE

This application is a Continuation Application of commonly-assigned, copending application Ser. No. 11/051,333, filed Feb. 7, 2005.

BACKGROUND OF THE INVENTION

1. Field of the Invention

The present invention relates to controlling storage, modification, and transfer of data in a network providing distributed data storage services. In particular, the present invention relates to creation and management of distributed file systems, and network-based file systems, that resolve a namespace (i.e., a fully-qualified path) of a file system object to a stored location of that file system object.

2. Description of the Related Art

A file system is a method for storing and organizing file system objects in a manner that ensures the file system objects are readily accessible. In other words, a file system is a set of abstract data types, referred to herein generally as file system objects, that are implemented for the storage, hierarchical organization, manipulation, navigation, access, and retrieval of data.

A fundamental aspect of a file system is that it maps namespaces to storage locations. Indices overlying the namespace also are used to organize the file system objects into a hierarchical organization referred to as directories. Consequently, a file system will establish a namespace (i.e., a fully qualified path to a file system object) relative to a root directory that is deemed the top-level position (i.e., the origin) within the hierarchical organization, such that all namespaces are structured relative to the root directory. For example, in the case of a Microsoft Windows-based operating system, the root directory is identified by the characters "\\". In addition, any location within the directory structure can be deemed a new root ("subroot"), for example in the case of organizing file system objects sharing the same subclass attribute.

A fundamental attribute of prior art file systems is that a fully qualified path for a given directory will map to a root on a given physical device, and all fully qualified paths for data objects within that directory will map to the same physical device. For example, the fully qualified name "\\cdrive\foo\bar" maps to a different physical device than ""\\ddrive\foo\bar"; however, the fully qualified name "\\cdrive\foo\file1" and the fully qualified name "\\cdrive\foo\bar" both map to the same physical device because both fully qualified names share the same physical device root of "\\cdrive".

In the Unix file system, a "hard link" may be used to create additional links to a directory, as described below, where a hard link references the same inode in the Unix file system. Hard links for a given file can be placed in different directories, however all the hard links for that given file must remain on the same physical device, and within the same physical partition if a disk has multiple partitions. In addition, the Unix/Linux "mount" command places the hierarchy of some device at an arbitrary location in the global namespace; however, the tree under this arbitrary location still is restricted to the same device, such that files cannot moved to different locations without updating the mount point.

FIG. 1 is a diagram illustrating a structure of a conventional prior art directory 10. The directory 10 includes a root directory 12 ("\\"), and subdirectories 14a, 14b, 14c, 14d, 14e, 14f.

File system objects include three types: collection objects, data objects, and redirect objects. In almost all file systems a collection object is effectively a data object; for example, the Unix or Linux command "opendir" enables a user to observe the contents of a directory (e.g., 14a) as a file.

FIG. 2 is a diagram illustrating a file system used for storage of files on a hard disk 28. FIG. 2 also illustrates a prior art collection object 18. The collection object 18 is illustrated in FIG. 2 as a directory table have a plurality of directory entries 20. Each directory entry 20 includes a name field 22, an attributes field 24, and a location (Loc) field 26 for a corresponding file in the file system. The name field 22 specifies an alphanumeric string assigned as a file name to the corresponding file. The attributes field 24 may store attributes relevant to the corresponding file (e.g., size, read/write permission, time of creation, last modified time, etc.). As illustrated with respect to the directory entry 20a, the Loc field 26 specifies the location (i.e., physical address) 36 on the disk 28 of the first data block (e.g., 512 bytes) (e.g., 30a) that stores the beginning of the corresponding data file having the name specified in the corresponding name field 22 (e.g., "foo"). In addition, the collection object 18 itself is stored on that same physical disk 28. The term "inode" has been used to describe the numeric address (e.g., "550") 36 on the disk 28 where the corresponding file (e.g., 30a) is stored. As used herein, however, the term "inode" also refers to the metadata that is attached to the file; hence, the inode is considered part of the file, but not part of the data that is in the file.

As illustrated in FIG. 2, the disk 28 also includes a File Allocation Table 32. The File Allocation Table 32, used in both Unix and Windows-based file systems, has a table entry 34 for each and every data block 30 on the disk 28 (Windows-based file systems refer to the table 32 as a "FAT", e.g., FAT-16 or FAT-32). Each of the entries 34 may be implemented either as a single bit indicating whether the block is allocated, or as a linked list as illustrated in FIG. 2, where a given entry (e.g., 34a at location 550) for a given data block (e.g., 30a) is referenced by the corresponding address 36 of the corresponding data block 30a, and will specify whether another entry (e.g., 34b at location 551) exists for the associated data object.

The file system has a directory entry 20a for the file "foo" having a location field 26 that specifies a corresponding location ("550") 36 of the first data block 30a. The File Allocation Table 32 has entries 34a, 34b that point to the successive data blocks 30b and 30c at respective locations "551" and "16" 36, enabling the file system to access the successive data blocks 30b and 30c and their respective table entries 34b, 34c. Hence, a file (e.g., having filename "foo") that utilizes three (3) disk blocks can be stored at disk blocks 30a (at location "550"), 30b (at location "551"), and 30c (at location "16"), where File Allocation Table entries 34a and 34b specify the successive next block locations 36, and the last entry 34c has a null pointer indicating an end of file entry (e.g., "0").

As illustrated in FIG. 2, the directory table 18 could include another directory entry 20b that points to the same location (e.g., 550) 36 on the disk. Hence, both the directory entry 22a having the name "foo" and the directory entry 22b having the name "bar" point to the same location 36 of entry 34a (and the corresponding data block 30a), even though the entries 22a and 22b have different attributes 24 (e.g., "attr1" and "attr2"), where the entry 20b specifies in the corresponding attribute field 24 that the file "bar" is a file ("F"). Although entries 22a and 22b pointing to the same location ("550") 36 is a valid example in the Unix file system of a hard link, these entries 22a and 22b referencing the same location ("550") 36 in a Windows-based file system is referred to a "cross-linked file", and is considered illegal in the Windows-based file system. Also note that the entry 20*c* (referencing the location 36 of entry 34*b* in the middle of the linked list formed by locations 34*a*, 34*b*, and 34*c*) is deemed illegal by all conventional file systems.

As apparent from the foregoing, the attributes field 24 and the associated directory entry (e.g., 20*a*) are stored separately from the referenced file (e.g., composed of the information at blocks 34*a*, 34*b*, and 34*c*). Consequently, since the location field 26 points to a location 36 on the hard disk 28, all the entries 20 of the directory 18 must reside on the same physical device 28. In other words, the location value "550" in the Loc field 26 of directory entry 20*a* would have no relevance on another disk because it may point to the middle of a linked list, described above as illegal in all existing file systems.

As described above, the directory table 18 is stored as a data object on the disk 28. Hence, the directory table 18 may include an entry 20*d* specifying in the corresponding attributes field 24 that the data object 30*d* having the name "Dir1" in the name field 22 has an attribute of being a directory ("D"), and a location field 26 specifying the location ("602") 36 of the data object 30*d* storing the directory contents.

Hence, all data elements within a collection must exist on the same physical device.

Redirect objects are references to target destinations. Redirect objects have been implemented using one of two methods: (1) named redirecting without using an additional data block 30 on the disk 28, and (2) redirecting using an additional data block 30 on the disk 28.

In the first example of named redirecting without using an additional data block on the disk, the redirect information is contained within the collection object 18. In particular, the collection object 18 will include an extended attribute field 38 in the directory entry 20*e* (implemented, for example, by using the next directory entry location) that specifies the location 36 of the target according to the name "Target" specified in the name field. Hence, the directory entry 20*e* has no corresponding location ("inode") 36 specified in the location field 26 or attribute in the attribute field 24 because there is no additional data block 30 allocated on the disk 28. However, any movement of the target file requires the extended attribute field 38 to be updated.

In the second example of redirecting using an additional data block 30 on the disk 28, a directory entry 20*f* specifies a redirect attribute ("R") in the corresponding attribute field 24 and which specifies in the location field 26 a corresponding location 36 for a data block 30*e* that stores information (e.g., an "inode") for reaching the target location (e.g., in the form of a text string). Hence, a "shortcut" in the Windows-based file system is an actual file 30*e* referenced by the directory entry 20*f*. In addition, the target specified in the file 30*e* may reference another volume (or device).

In both instances, however, the entries 20*e* or 20*f* need to be updated if the target 30*e* is moved from its location ("570"). Moreover, in the case of a named reference in data block 30*e*, if the device "X" in the string "\\X\Y\Z" was no longer available (e.g., device "X" was a computer and "Y\Z" was a redirect object to another device A having a file B), the target file would be deemed lost, even if only the redirect object was lost but the target file was still available.

FIG. 3 is a diagram illustrating a directory structure between two devices in a network. As illustrated in FIG. 3, the network 40 includes devices 42 ("User1") and 44 ("Server"). The device 42 includes a local directory identifier 46 ("Z:") that serves as a local substitution for the directory identifier "\DATA\User2\Shared\" 48 that identifies a subdirectory 50 on the device 44. As illustrated in FIG. 3, the subdirectory 50 includes a file "File1" 52*a*.

If the device 42 advertises the file "File1" 52*a* on the wide area network (e.g., the Internet) 54 using the expression "Z:\File1" 56, the file 52*a* might not be visible via the network 54 despite the visibility of the device 42, because the local directory identifier "Z:" 46 is no more than a local resolution within the device 42 of the name "Z:" to the location "\\Server\DATA\User2\Shared". Hence, the local directory identifier "Z:" not a fully qualified path. Consequently, if the device 42 is no longer available, the file 52*a* is no longer accessible via the expression "Z:\File1" 56 even though the file 52*a* is still available in the device 44 via its fully qualified name "\\Server\DATA User2\Shared\File1". If the device 44 is unavailable then the file 52*a* is not accessible via any path.

In addition, assume the device 42 had a fully qualified name "\\User1\Public\File2" for a locally-stored file 52*b* and that the device 44 had a fully qualified name "\\Server\DATA\User1\Shared\File2_Shortcut" for a shortcut file 52*c* that specified the fully qualified name "\\User1\Public\File2". In this case, opening the file 52*c* results in retrieval of the fully qualified name "\\User1\Public\File2". If the device 44 is unavailable, then the file 52*b* is still available via its fully qualified path "\\User1\Public\File2" if an accessing node already has the fully qualified path. Note, however, that accessing the files 52*a* and 52*b* still requires accessibility of the respective fully qualified paths "\\Server\DATA\User2\Shared\File1" and "\\User1\Public\File2" within their respective file systems, independent of the actual data files 52*a* and 52*b*.

Consequently, there may be multiple paths to a file, but the accessibility to the file depends on the accessibility of the devices that provide context for the corresponding path.

Many remote file systems use only a file name and a dynamically-generated "handle" to refer to the file. For example, the Network File System (NFS) performs a lookup using a file name, where a handle to the file is returned; however, the handle is valid for only one server, and only for one session; further, a different client may receive a different handle for the same file. Plan 9 is similar to NFS in using a handle, with similar restrictions.

The Self-certifying File System (SFS) uses handles that statically map to specific servers, such that the location of the file referenced by the handle cannot be changed. The Cooperative File System (CFS) uses block identifiers, however the data that is referenced is static in that the block identifier is bound to the content of the object; hence, if a file needs to be added, removed, or modified, a new block identifier must be created for each corresponding modified block. CORBA also maps file names to handles, however the handles include the server address, resulting in the handle being necessarily tied to the storage location.

Hence, each of the aforementioned file systems rely on some relationship (context) between the referenced file and its referencing identifier ("handle"), where the relationship may be content, user, storage location, session, server identifier, etc.

Unlike directory entries, Microsoft has used registry entries that specify a globally available name and a 16-byte Globally Unique Identifier (GUUID): a query specifying the global name will return the GUUID. However, use of a GUUID requires: (1) accessing a registry to determine how to process a type of file (e.g., a .GIF file); (2) receiving from the registry a result specifying that a specific file handler should be used (e.g., a GIF file handler); (3) receiving from the specific file handler the GUUID for the specific file handler.

The device must then search the registry for the GUUID to determine whether the GUUID corresponds to a local resource on the device, or whether the resources specifies a name of a remote device configured for processing the file. In addition, each device in a network is required to have a mapping of each GUUID its corresponding registry entry.

SUMMARY OF THE INVENTION

There is a need for an arrangement that enables a data file to be universally accessible, where a data file is reachable using a unique object identifier that is independent of any attribute of the data file.

These and other needs are attained by the present invention, where each data file of a distributed file system is identified by a corresponding globally-unique object identifier that is independent of any attribute of the data file. In particular, a node in the distributed file system has a file system that includes a plurality of directory entries, where each directory entry has at least a file name field and an object identifier field configured for specifying a globally-unique object identifier. The globally-unique object identifier is universally reachable by any node of the distributed file system and uniquely identifies the data file, enabling the data file to be universally identifiable by any node based on the corresponding object identifier. Consequently, the data file can be stored independently of a device file system based on providing a resolution between the data file name and its object identifier, followed by a resolution between the object identifier and a selected location for the data file. Moreover, use of an object identifier enables multiple copies of the same data file to be distributed throughout multiple nodes on a distributed file system, where the resolved selected location for the data file is selected based on attributes of the device requesting the location.

Hence, the necessity of storing a fully qualified path for a file on the same physical device that stores the referenced file is eliminated, since the object identifier for a data file is an arbitrary reference that can be resolved dynamically to locate the data file.

One aspect of the present invention provides a method in a node, the method including identifying a data object, and determining for the data object a unique object identifier that is assigned to the data object and having a value that is independent of any attribute of the data object. The method also includes obtaining a storage location for the data object based on sending a query specifying the unique object identifier, and obtaining a resolution that specifies the storage location based on the unique object identifier. The determining of a unique object identifier that is independent of any attribute of the data object ensures that any directory structure can reference the data object by its unique object identifier without regard to movement of the data object, eliminating the necessity of updating the directory structure if the data object is moved or if some other attribute of the data object is changed. Rather, the storage location can be determined based on obtaining the resolution based on the unique object identifier.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
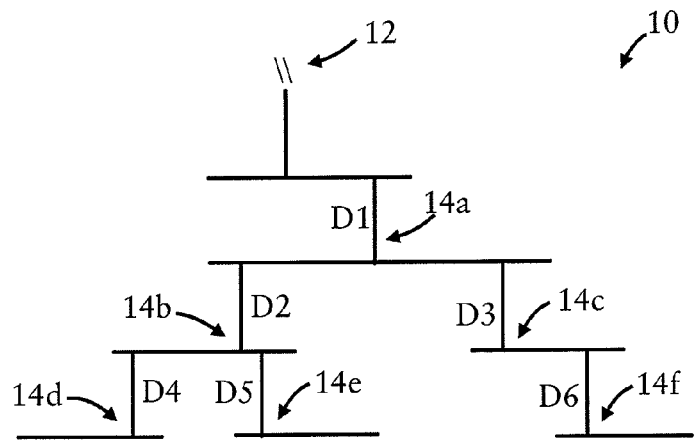
FIG. 1 is a diagram illustrating a conventional (Prior Art) directory.
Figure 2:
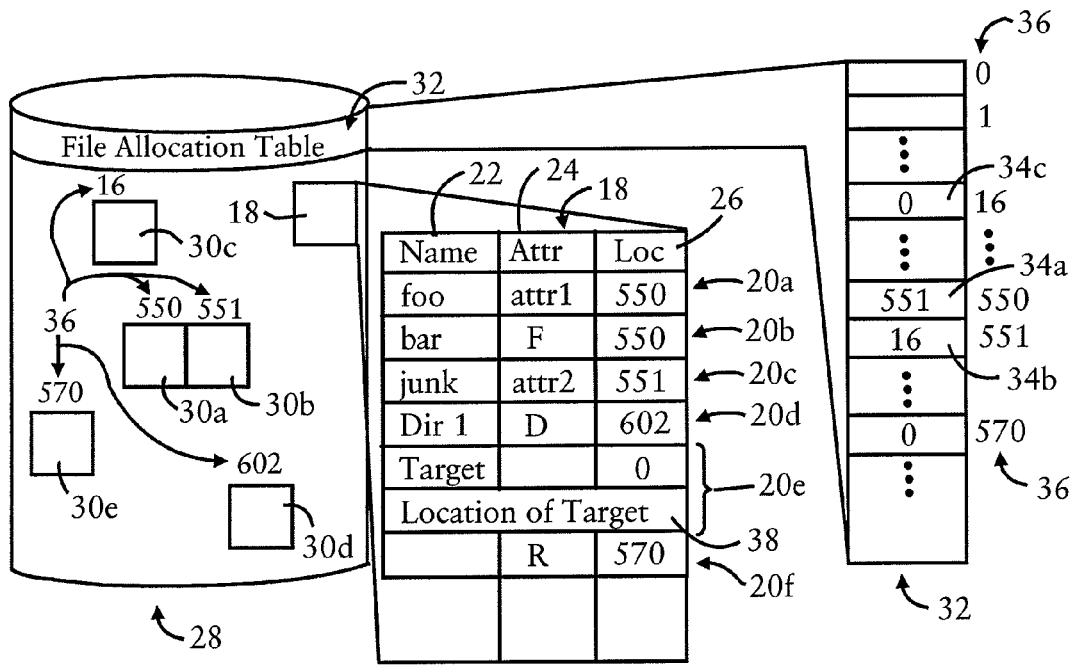
FIG. 2 is a diagram illustrating a conventional (Prior Art) file system used for storage of files on a hard disk.
Figure 3:
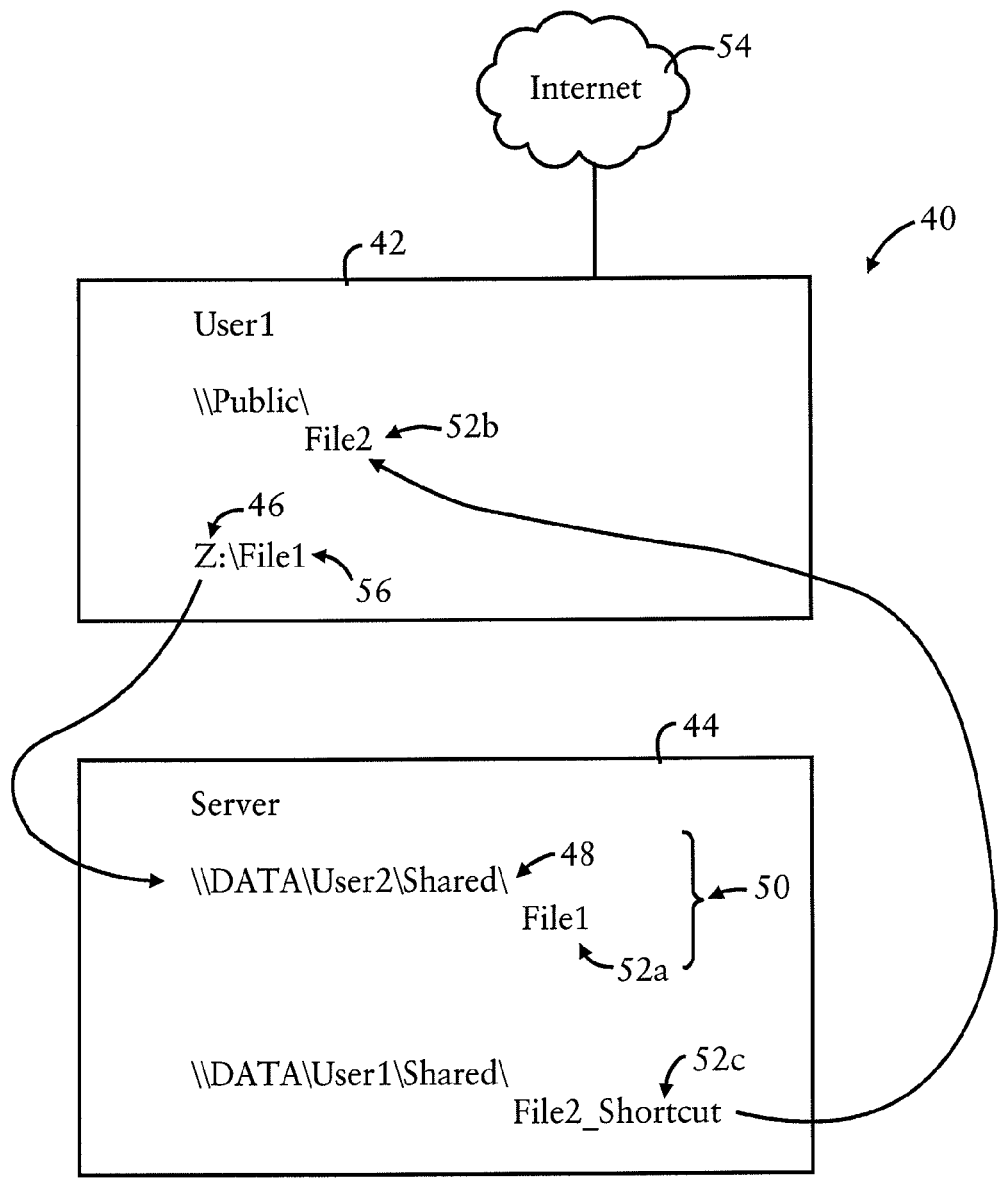
FIG. 3 is a diagram illustrating a conventional (Prior Art) directory structure between two devices in a network.
Figure 4:
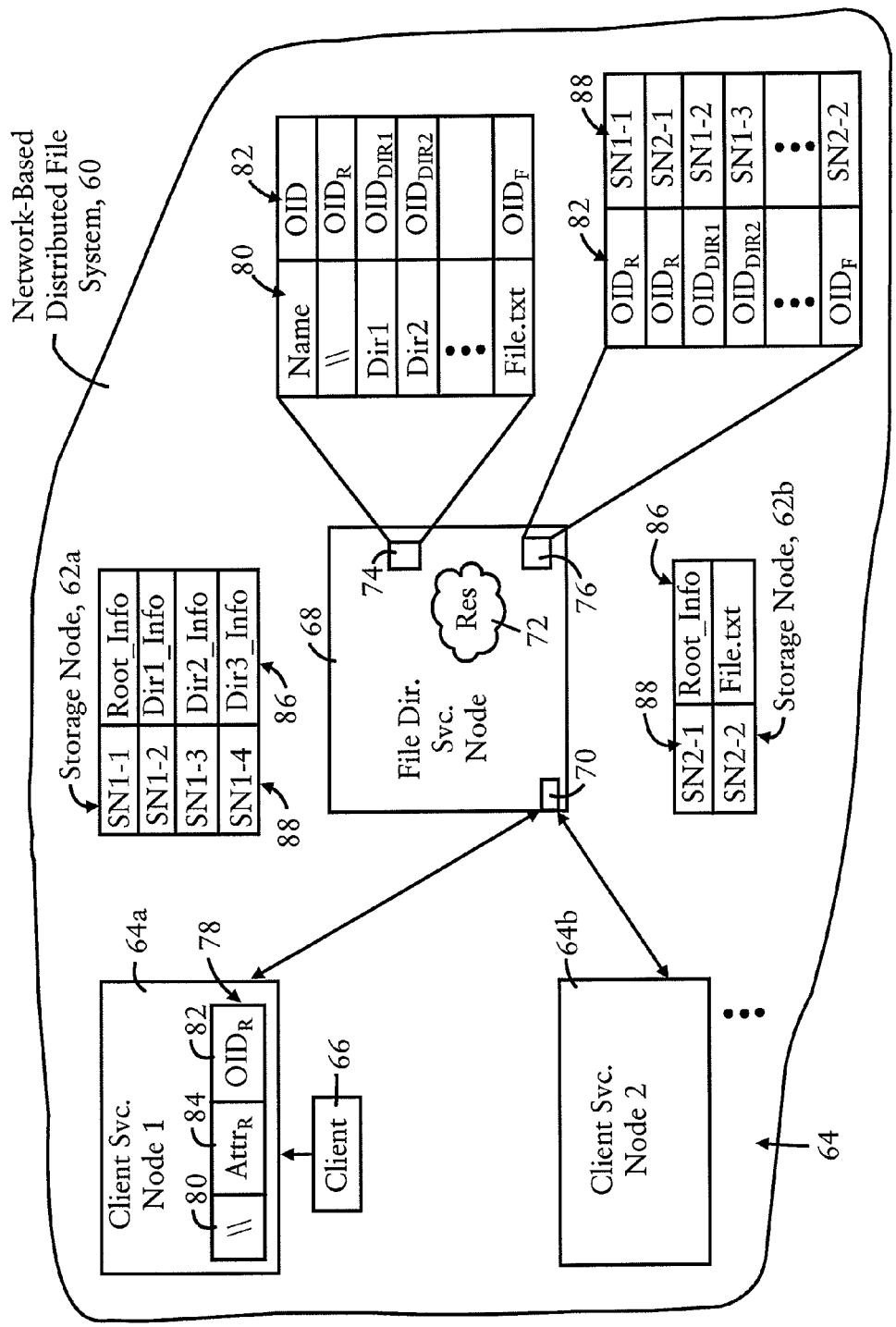
FIG. 4 is a diagram illustrating a distributed file system having distributed storage devices and a service node for resolving data objects to unique object identifiers, according to an embodiment of the present invention.

FIG. 4 is a diagram illustrating a network-based distributed file system 60 configured for mapping namespaces to respective globally-unique object identifiers, according to an embodiment of the present invention. As described above, prior art file systems suffered from the disadvantage of mapping namespaces to storage locations, requiring that all fully qualified paths established relative to a root directory must be stored on the same physical device. In addition, prior file systems assigned handles or identifiers to files based on some attribute of the file, such as server, session, client, content, etc.

The disclosed embodiment eliminates the necessity of storing fully-qualified paths or directory entries on the same physical device, based on assigning to each data object a corresponding unique object identifier (OID) (e.g., a 128-bit value) that is universally reachable within the distributed file system 60. In particular, the object identifier for a data object is an arbitrary reference that is resolved dynamically in order to find location information for the corresponding data object. Moreover, the unique OID is independent of any attribute of the data object, such as storage location, data object content, data content ownership, data object source (e.g., device providing the data object to the client), data object destination (e.g., client requesting the data object), client session, etc.

Hence, a user of a file system may utilize a tree-based directory, where each node of the directory (e.g., root node, directory, the subdirectory, files within the subdirectory, etc.) may be stored on a separate storage device within the distributed file system 60. Moreover, the separation of data object identification from any data object attribute as described above enables the same data object to be stored at multiple locations, and also allows the object identifier to be resolved to a selected location based on various selection criteria, including requesting device attributes, locality of the requesting device relative to the storage locations, traffic management of the storage locations, etc. The separation of data object identification from any data object attribute also allows the data object to be manipulated as needed (e.g., moved, modified, change data content ownership regarding read/write permissions, etc.) without changing the data object identification.

The distributed file system 60 of FIG. 4 includes storage nodes (e.g., 62a, 62b) distributed throughout the distributed file system 60, a plurality of service nodes 64, client devices 66 configured for attaching to a service node 64 in order to obtain distributed file services, and at least one file directory service node 68. Each client service node 64 is configured for providing distributed file services for connected clients 66, including accessing, creating or modifying data objects (e.g., files and/or directories). Each storage node 62 is configured for storing data objects 86 (including attribute information) at respective storage locations 88.

Figure 5:
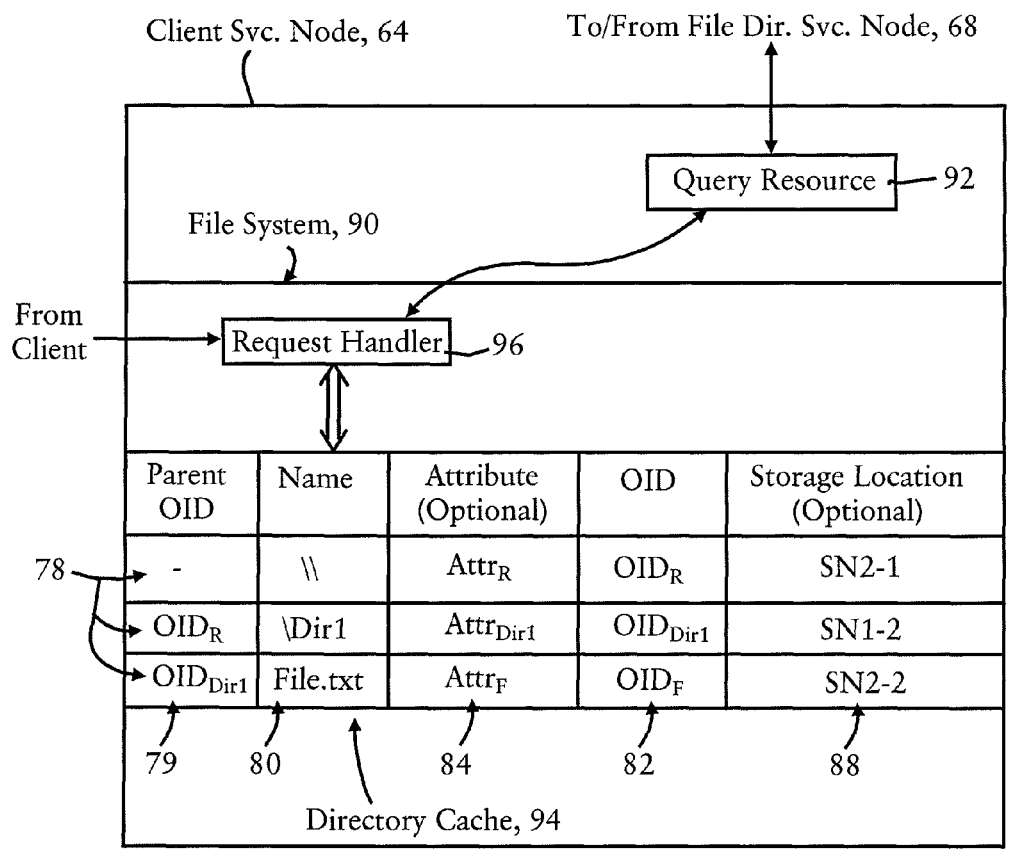
FIG. 5 is a diagram illustrating one of the client service nodes of FIG. 4.

FIG. 5 is a diagram illustrating one of the client service nodes 64 of FIG. 4. Each client service node 64 is configured for maintaining for each connected client 66 a device file system 90 configured for identifying data objects 86 having been requested by the client 66 for either a read operation or a write operation. The device file system 90 includes a request handler 96 configured for receiving read/modify/write requests from the client 66, and accessing the data objects specified in the request: if the information is not cached locally within a directory cache for the client 66, the request handler passes the request to a query resource 92.

As described below, each client service node 64 includes a query resource 92 configured for outputting a query that specifies a name 80 for a data object 86 in order determine the unique OID 82 assigned to the data object 86 having the corresponding name 80. Upon receiving the unique OID (e.g., $OID_R$, $OID_{Dir1}$) 82 for the corresponding data object (e.g., "Root_Info", "Dir1_Info") 86, the client service node 64 can create a directory cache entry 78 within a directory cache 94 for temporary storage of the name 80, the corresponding unique object identifier 82, and related attribute information 84. As described below, each client service node 64 also is configured for outputting a second query in order to identify the storage location 88 of the data object 86 based on the corresponding OID 82. Hence, the distributed nature of the file system 60 becomes transparent to the client 66. Alternately, the features of the service node 64 as described herein could be implemented within the client 66.

The file directory service node 68 is configured for providing resolutions to queries from the client service nodes 64 for location information of identified data objects. The file directory service node 68 includes a network interface 70, a resolution resource 72, and tables 74 and 76. The resolution resource 72 is configured for resolving namespace queries (e.g., queries that specify a name 80) based on retrieving the assigned OID 82 from the object identifier table 74; if there is no matching OID 82 for the name, the resolution resource 72 is configured for treating the query as a request for a new OID for a new object name, and adds a new entry to the object identifier table 74.

The resolution resource 72 also is configured for resolving secondary queries that request the storage location 88 (e.g., SN1-1, SN2-1) of the data object 86 (e.g., "Root_Info" for root directory "\") based on the corresponding object identifier (e.g., $OID_R$) 82. As illustrated in FIG. 4, the location resolution table 76 may include multiple location entries (e.g., SN1-1, SN2-1) 88 for a given object identifier (e.g., $OID_R$) 82, enabling the resolution resource 72 to select a location 88 that is most appropriate for the requester, based on determined attributes such as security, locality, network traffic, node utilization, etc. Further, the multiple location entries 88 for a given object identifier 82 in the location resolution table 76 enables the multiple copies of the data objects (e.g., "Root_Info") 86 stored at respective storage locations (e.g., SN1-1, SN2-1) to be moved to different locations without disrupting the directory structure maintained in the object identifier table 74. Hence, if any client service node 64 determines that a cached location entry 88 within its cache entry 78 is invalid, the client service node 64 can update its cache entry 78 by sending a location query to the file directory services node 68 specifying the corresponding OID 82.

Unlike the prior art redirect objects, which need to be updated if the referenced file is moved due to the corresponding link being broken, the disclosed embodiment enables a data object to be moved without the necessity for updating any file system, since the unique object identifier (OID) is independent of the storage location of the data object. Consequently, if a data object 86 is moved, the device moving the data object can send an update message to a single location resource configured for resolving OIDs to respective locations; multiple distributed location resources can exchange location information in response to received update messages. Hence, any changes in the storage location of the data object are detected during resolution of a storage location based on the OID.

In addition, the disclosed embodiment supports instances where a file is being read or written to, where the file has no name and therefore no directory entry that points to the file; for example, in a UNIX-based file system a file can be created, and then the file can be unlinked, enabling read/write access to the open file but that cannot be found by any other entity. In this case, the disclosed embodiment still assigns a corresponding OID, but relevant attributes (described below) determine the best location to be supplied to a node, including whether a null location is returned indicating a denial of the request for security reasons. At a minimum, the data object can be manipulated solely based on its OID, without the necessity of a file name or an attributes field.

Although FIG. 4 illustrates the file directory services node 68 as containing both the object identifier table 74 and the location resolution table 76, it will be readily apparent that the object identifier table 74, the location resolution table 76, and the associated operations of the resolution resource 72 can be partitioned into discrete service nodes to provide further distributed processing. Moreover, multiple copies of the file directory services node 68, and/or the partitioned discrete service nodes, can be implemented within the distributed file system 60.

As described below, data objects can be organized into a "ragged" hierarchy that eliminates the necessity of utilizing fully qualified names. Rather, the file directory services node 68 is able to identify a data object that is a child of a parent directory based on a query that specifies the OID of the parent directory, and the child name. As illustrated in FIG. 5, each cache entry 78 is configured for storing the parent directory OID 79, and the object name 80. Hence, the disclosed embodiment employs a file system that eliminates the necessity of fully qualified names based on identifying parent-child relationships based on child name 80 and parent OIDs 79.

Figure 6A:
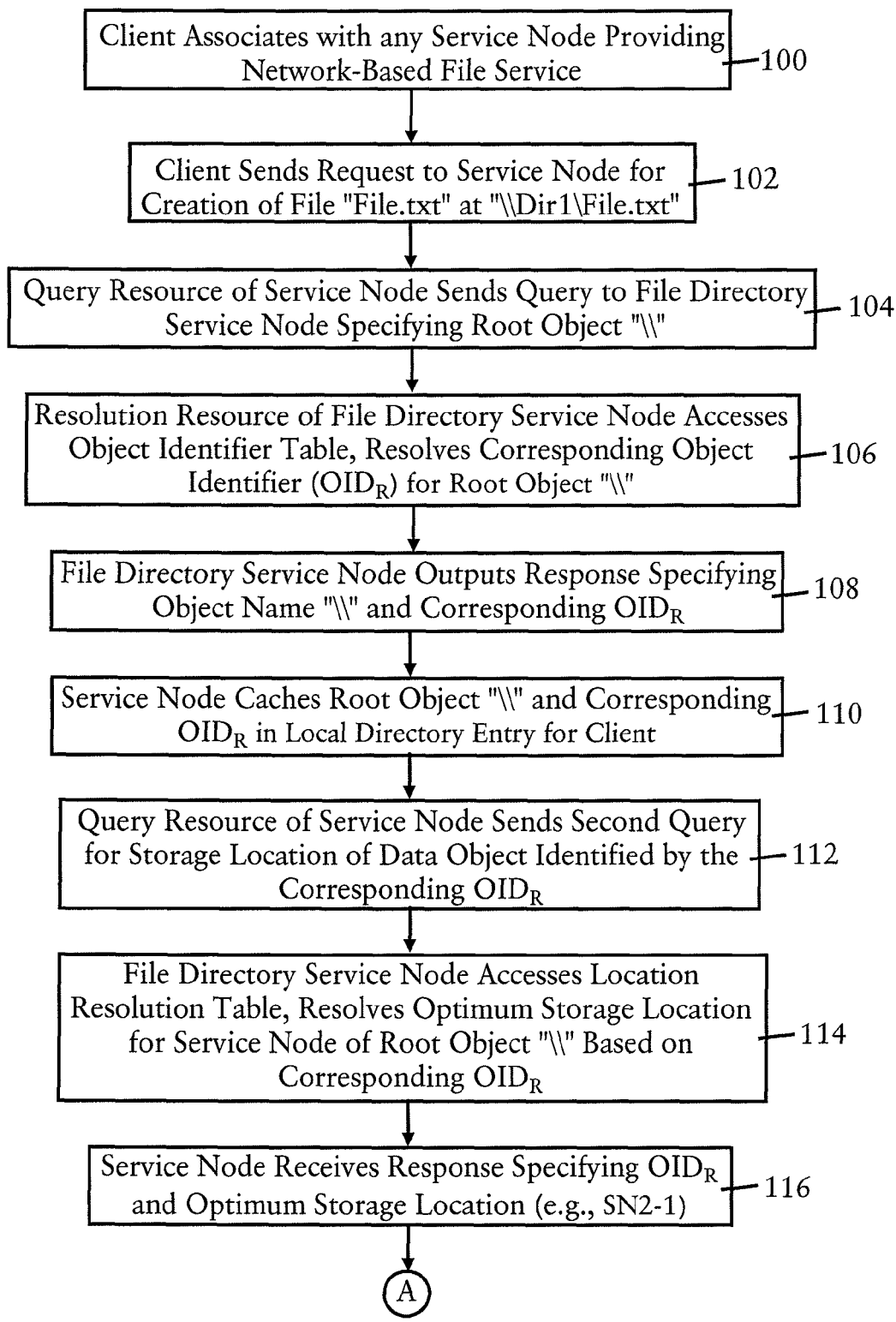
FIGS. 6A and 6B are diagrams summarizing the method of access and retrieval of data objects from the distributed file system of FIG. 4, according to an embodiment of the present invention.
Figure 6B:
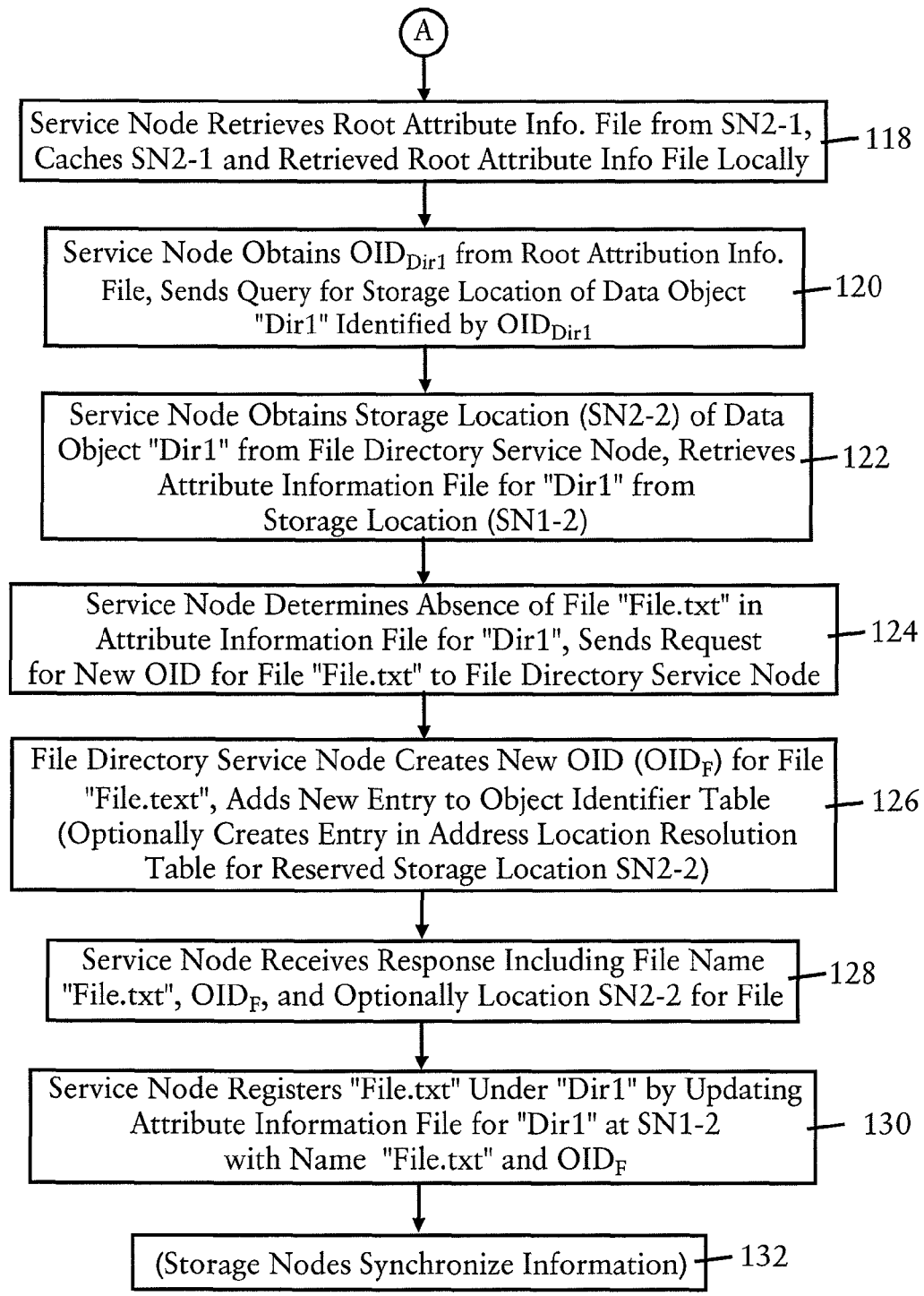

FIGS. 6A and 6B are diagrams summarizing the method of accessing a data object 86 in the distributed file system 60 of FIG. 4, according to an embodiment of the present invention. The steps described herein can be implemented in each network node as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 100, where the client 66 associates with any one of the client service nodes 64, for example node 64a. The client 66 sends in step 102 a request to the associated service node 64a for creation of a new file "File.txt" within a subdirectory of the distributed file system 60 that would result in the fully qualified name "\Dir1\File.txt" 80. Assuming in this description that the directory cache 94 is empty, the request handler 96 of the client service node 64a would determine an absence of any entry in the directory cache 94., and therefore would pass the request to the query resource 92.

The query resource 92 sends in step 104 a query to the file directory service node 68 that specifies the root object name "\\" 80. The network interface 70 of the service node 68, upon receipt of the query, forwards the query to the resolution resource 72. The resolution resource 72 accesses in step 106 the object identifier table 74, and resolves the corresponding object identifier ($OID_R$) 82 for the root directory data object ("Root_Info") based on the corresponding root object name "\\" 80. The resolution resource 72 outputs in step 108 the response to the client services node 64a specifying the object name "\\" 80 and the corresponding OID ("$OID_R$") 82.

The query resource 92 in the client services node 64a passes the response to the request handler 96, which caches in step 110 the root object name "\\" 80 and the corresponding OID ("$OID_R$") 82 as a cache entry 78 in the directory cache 94. The query resource 92 sends in step 112 a second query to the file directory services node 68 (or any other location resolution resource) for the storage location 88 of the data object 86 for the root directory, based on the corresponding OID ("$OID_R$") 82.

In response to receiving the second query, the resolution resource 72 of the file directory services node 68 accesses in step 114 the location resolution table 76, and resolves the most appropriate (i.e., optimum) storage location 88 for the service node 64a, based on the corresponding OID ("$OID_R$") 82 and determined attributes. As described above, the data object ("Root_Info") 86 for the root directory identified as "\\" is stored in multiple storage locations 88 (e.g., SN1-1, SN2-1); hence, the resolution resource 72 may select between different storage locations 88 based on attributes of either the client service node 64a having issued the request, the client device 66, network loading, etc. The resolution resource 72 resolves the optimum storage location and sends in response to the query specifying the OID ("$OID_R$") 82 and the corresponding selected storage location (e.g., "SN2-1") 88. The service node 64a receives in step 116 the response specifying the OID 82 and the corresponding selected storage location 88.

Referring to FIG. 6B, the query resource 92 of the client services node 64a passes the response to the request handler 96 for caching the storage location information 88 in the corresponding entry 78 based on the OID, and retrieves in step 118 the root attribute information file ("Root_Info") 86 from the specified storage location (SN2-1) from storage node 62b. The request handler 96 therefore caches in the root directory entry 78 the name ("\\") 80, the retrieved root attribute information file ("Root_Info") 86 as the attributes 84, the root OID ("$OID_R$") 82, and the storage location (SN2-1) 88 of the attributes file 86. As indicated above, storage of the attribute information in the storage location is optional, depending on implementation.

The request handler 96 reads the root attribute information file ("Root_Info") 86 retrieved from the storage node 62b, detects the data object identifier "Dir1" 80 and its corresponding OID ("$OID_{Dir1}$") 82 from within the root attribute information file ("Root_Info") 86, and causes the query resource 92 to send in step 120 a query for the storage location 88 of the data object 86 associated with the corresponding OID ("$OID_{Dir1}$") 82. The resolution resource 72 within the file directory service node 68 resolves the query based on accessing the location resolution table 76, and returns the storage location (SN1-2) 88 corresponding to the object identifier ("$OID_{Dir1}$") 82 for the directory having the name "Dir1" 80. The service node 64a obtains the storage location (SN1-2) 88 for the directory "Dir1" in step 122, and retrieves the attribute information file ("Dir1_Info") 86 from the specified storage location (SN1-2) 88 in the storage node 62a.

Note that if there was no directory "Dir1" in the root directory "\\", or if the OID ("$OID_{Dir1}$") 82 was not specified in the root attribute information file, the request handler 96 could send a query that specifies the root OID ("$OID_R$") and the name "Dir1", indicating to the file directory services node 68 that the name "Dir1" is a child within the parent directory identified by the OID ("$OID_R$"), namely the root directory "\\".

The request handler 96 caches the retrieved information related to the directory "Dir1" as a separate cache entry 78 in the directory cache 94, and parses the retrieved attribute information file "Dir1_Info" 86 to determine whether the data object "File.txt" is specified within the information file "Dir1_Info" 86. In response to detecting an absence of the data object "File.txt", the request handler 96 causes the query resource 92 to send a request in step 124 for a new OID 82 for the file "File.txt", the request including the parent directory OID ("$OID_{Dir1}$") to indicate that the file "File.txt" is to be a child of the parent directory "Dir1".

The resolution resource 72 in the file directory service node 68 (or a creation resource) creates in step 126 a new OID ("$OID_F$") 82 for the file having the name "File.txt" 80, and adds the new entry to the object identifier table 74. Optionally, the resource 72 also at this time may reserve a storage location 88 for the new file based on creating an address entry in the address resolution table 76, illustrated in FIG. 4 as the address value "SN2-2". The service node 64a receives in step 128 the response including the filename 80, the newly-created OID ("$OID_F$") 82, and optionally the storage location 88 for the file and/or attributes associated with the file having the name "File.txt" 80.

The service node 64a then caches the information as a new entry 78 in the directory cache 94, and registers in step 130 the newly-created file having the name "File.txt" 86 under the directory bearing the name "Dir1" by updating the corresponding attribute information file "Dir1_Info" 86 at the known location SN1-2 with the name of the file "File.txt" 80 and the corresponding OID ($OID_F$) 82. The storage nodes 62a, 62b, etc. associated with a directory attribute information file at that point may synchronize information in step 132, assuming the update is performed by the client services node. As apparent from the foregoing, the updating of the directory attribute information file "Dir1_Info" 86 may be performed centrally by the file directory services node 68.

As illustrated in FIG. 5, the client services node 64 retrieved the object information for the root directory "\\" and the file "File.txt" from the storage node 62b at locations "SN2-1" and "SN2-2", respectively, but retrieved the object information for the intervening directory "Dir1" from the storage node 62a at location "SN1-2". Hence, the data objects and their respective names and attributes can be arbitrarily separated on different devices, enabling data migration within the distributed file system without the necessity of rebuilding fully qualified names or Unix-type hardlinks.

According to the disclosed embodiment, a distributed file system enables arbitrary directory structures to be implemented without the necessity of fully qualified names being stored on the same storage device. Rather, each data object is uniquely identifiable by a corresponding unique object identifier, enabling the replication and storage of the data object at multiple arbitrary locations independent of any directory structure based on performing a resolution between the data object and its corresponding unique object identifier. Moreover, use of the unique object identifier enables selection of an optimal storage location from multiple storage locations, and further enables data object to be moved without the necessity for reconfiguring broken legs; rather, a node can simply request an updated location resolution using the unique object identifier.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a first network service node of a distributed file system, the method comprising:

receiving by the first network service node, from a second network service node in the distributed file system, a request for a unique object identifier assigned to a data file that does not include directory information, the data file further not including any fully qualified path to any data file stored in the distributed file system, the unique object identifier unique within the network-based distributed file system, the unique object identifier separating identification of the data file, by the distributed file system, from any attribute of the data file or any directory structure in any storage nodes storing the data file, the distributed file system implemented as a network-based distributed file system and configured for storing copies of the data file within the storage nodes within the distributed file system at respective storage locations; and outputting to the second network service node, by the first network service node, a response to the request that specifies the unique object identifier, wherein each data file stored in the distributed file system has a corresponding unique object identifier to access the corresponding data file without use of any fully qualified path in the distributed file system.

2. A distributed file system comprising:

storage devices distributed throughout the distributed file system, each configured for storing data files at respective storage locations, the distributed file system implemented as a network-based distributed file system for storage of copies of the data files among the storage devices at their respective storage locations, wherein the data files do not include directory information or any full qualified path to any of the data files;

a first network service node configured for providing resolutions to queries for unique object identifiers assigned to the data files, respectively, each unique object identifier assigned to the corresponding data object unique within the network-based distributed file system, the unique object identifier separating identification of the data file, by the distributed file system, from any attribute of the data file or any directory structure in any of the storage devices; and a second network service node configured for determining the unique object identifier for a corresponding one of the data files based on outputting the corresponding query into the distributed file system and receiving the corresponding resolution, the second network service node further configured for obtaining a second resolution, that specifies the corresponding storage location of the corresponding copy of the one data file at one of the storage devices storing the one data file, based on the corresponding unique object identifier.

3. A network service node of a distributed file system, the network service node comprising:

a network interface configured for receiving, from a second network service node in the distributed file system, a request for a unique object identifier assigned to a data file that does not include directory information, the data file further not including any fully qualified path to any data file stored in the distributed file system, the unique object identifier unique within the network-based distributed file system, the unique object identifier separating identification of the data file, by the distributed file system, from any attribute of the data file or any directory structure in any storage nodes storing the data file, the distributed file system implemented as a network-based distributed file system and configured for storing copies of the data file within the storage nodes within the distributed file system at respective storage locations; and a resolution resource configured for outputting to the second network service node a response to the request that specifies the unique object identifier, wherein each data file stored in the distributed file system has a corresponding unique object identifier to access the corresponding data file without use of any fully qualified path in the distributed file system.

4. The method of claim 1, wherein:

the request specifies that the data file is a new data file;

the outputting includes selecting a new identifier as the unique object identifier, and storing in a table an entry that specifies the unique object identifier for the new data file.

5. The file system of claim 2, wherein the second network service node is configured for supplying in the query a name of the one data file, and the first network service node is configured for providing the corresponding resolution that specifies the name of the one data file and the corresponding unique object identifier.

6. The node of claim 3, further comprising a table configured for storing an entry, wherein:

the request specifies that the data file is a new data file; and the resolution resource is configured for selecting a new identifier as the unique object identifier, and storing in the table said entry specifying the unique object identifier for the new data file.

7. The method of claim 4, further comprising:

the first network service node storing in a second table at least one entry specifying the unique object identifier and a corresponding location as the storage location for a corresponding copy of the data file;

the first network service node receiving a query from the second network service node specifying the unique object identifier and requesting the storage location for the unique object identifier; and the first network service node selectively supplying to the second network service node at least one of the locations specified in the at least one entry based on the unique object identifier and determined attributes.

8. The file system of claim 5, wherein the second network service node is configured for obtaining the second resolution based on sending a second query that specifies the unique object identifier for the corresponding one data file, the first network service node configured for providing the second resolution, specifying the corresponding unique object identifier and the corresponding storage location of the one data file, based on the corresponding unique object identifier and determined attributes relevant to the second network service node.

9. The node of claim 6, further comprising a second table, wherein:

the resolution resource is configured for storing in the second table at least one entry specifying the unique object identifier and a corresponding location as the storage location for the data file;

in response to the network interface receiving a query from the second network service node specifying the unique object identifier and requesting the storage location for the unique object identifier, the resolution resource is configured for selectively supplying to the second network service node at least one of the locations specified in the at least one entry based on the unique object identifier and determined attributes.

* * * * *